US010341917B2

(12) United States Patent
Vare et al.

(10) Patent No.: US 10,341,917 B2
(45) Date of Patent: Jul. 2, 2019

(54) METHOD FOR BANDWIDTH SHARING (71) Applicant: Teleste Oyj, Littoinen (FI)

(72) Inventors: Jani Vare, Kaarina (FI); Kari Virtanen, Naantali (FI)

(73) Assignee: Teleste Oyj, Littoinen (FI)

( * ) Notice: Subject to any disclaimer, the term of this patent is extended or adjusted under 35 U.S.C. 154(b) by 0 days.

(21) Appl. No.: 15/759,705

(22) PCT Filed: Sep. 14, 2015

(86) PCT No.: PCT/FI2015/050605
§ 371 (c)(1),
(2) Date: Mar. 13, 2018

(87) PCT Pub. No.: WO2017/046439
PCT Pub. Date: Mar. 23, 2017

(65) Prior Publication Data
US 2018/0199250 A1   Jul. 12, 2018

(51) Int. Cl.
*H04W 36/08* (2009.01)
*H04W 48/20* (2009.01)
(Continued)

(52) U.S. Cl.
CPC ............. *H04W 36/08* (2013.01); *H04W 8/24* (2013.01); *H04W 28/08* (2013.01); *H04W 36/24* (2013.01);
(Continued)

(58) Field of Classification Search
CPC ....... H04W 36/08; H04W 48/20; H04W 8/24; H04W 36/24; H04W 28/08; H04W 84/12; H04W 88/08; G06T 11/206
See application file for complete search history.

(56) References Cited

U.S. PATENT DOCUMENTS

2004/0166852 A1   8/2004  Backers et al.
2004/0229621 A1   11/2004 Misra
(Continued)

FOREIGN PATENT DOCUMENTS

WO    WO2006013533    2/2006

OTHER PUBLICATIONS

Written Opinion dated Jan. 20, 2016 from PCT Application No. PCT/FI2015/050605, 7 pages.
(Continued)

*Primary Examiner* — Ajay Cattungal
(74) *Attorney, Agent, or Firm* — Hollingsworth Davis, LLC (57) ABSTRACT

A method and related apparatus for sharing bandwidth in communication between a plurality of mobile clients and a plurality of access points, the method comprising: receiving client information from the plurality of mobile clients; determining that each of the plurality of mobile clients has been connected to an access point; determining if any access point has a subgroup of multiple mobile clients connected to it; and if affirmative, determining, on the basis of the client information, possible access points for each mobile client in said subgroup; assigning, for a first mobile client residing outermost in said subgroup, the outermost possible access point in the corresponding direction; assigning, for any subsequent mobile client in said subgroup, the outermost possible, non-assigned access point in the same direction as for the first mobile client; and signalling, to any mobile client requiring re-location to another access point, the identification of the assigned access point.

16 Claims, 5 Drawing Sheets

(51) Int. Cl.
  *H04W 8/24* (2009.01)
  *H04W 36/24* (2009.01)
  *H04W 28/08* (2009.01)
  *G06T 11/20* (2006.01)
  *H04W 84/12* (2009.01)
  *H04W 88/08* (2009.01)

(52) U.S. Cl.
  CPC ........... *H04W 48/20* (2013.01); *G06T 11/206* (2013.01); *H04W 84/12* (2013.01); *H04W 88/08* (2013.01)

(56) References Cited

U.S. PATENT DOCUMENTS

2007/0184831 A1  8/2007  Morimoto
2007/0217377 A1  9/2007  Takeuchi

OTHER PUBLICATIONS

Written Opinion dated Sep. 8, 2017 from PCT Application No. PCT/FI2015/050605, 6 pages.
International Preliminary Report on Patentability dated Dec. 8, 2017 from PCT Application No. PCT/FI2015/050605, 20 pages.

METHOD FOR BANDWIDTH SHARING

TECHNICAL FIELD

The invention relates to wireless data offload systems, specifically to bandwidth sharing in such systems.

BACKGROUND

Data offload generally refers to a transfer process of data that is temporally stored on a physical medium, such as a Network video recorder, to a desired destination upon detecting a suitable connection for the data transfer. The offload can be carried out wirelessly or with wired connection. The use of complementary or dedicated technology for the data offload purposes is especially advantageous in a situation where the data network resource allocated for the data delivery is about to reach its maximum capacity.

A specific challenge in wireless data traffic is the data delivery to and from mobile vehicles, especially public transportation vehicles, like trains, trams, metro trains and busses. A moving vehicle, as such, poses challenges to reliable data transfer, where the usable data rate typically reduces as a function of the speed of the vehicle. Many public transportation operators have started to offer a wireless data connection, such as a Wi-Fi connection, for the passengers to use during their trip. Moreover, the requirements for using video surveillance in public transportation vehicles are continuously increasing. The video data from a plurality of surveillance cameras, together with the data traffic of the passengers, easily amounts to an extensive quantity of data, which cannot be transferred within the capacity of current wireless networks without a significant delay.

In public transportation vehicles, the wireless offload is typically carried out when the vehicle stops, or at least slows down, at a predetermined location, such as a train station or a bus stop. Wireless offload system of the vehicle may include several clients which perform wireless offload simultaneously with a plurality of access points located at said predetermined location. The clients aim to connect to an access point offering the strongest signal. This easily leads to a situation, where all clients of the vehicle try to connect to one or two access points offering the strongest signal, while no client tries to connect to the remaining access points. In other words, the available bandwidth of all access points is unevenly utilized and non-optimally shared between the clients, and subsequently all clients sharing the same access point experience poorer performance of wireless offload.

SUMMARY

Now, an improved arrangement has been developed to reduce the above-mentioned problems. As different aspects of the invention, we present a method, a system, a mobile communication unit and an access point, which are characterized in what will be presented in the independent claims. The dependent claims disclose advantageous embodiments of the invention.

The first aspect of the invention comprises a method for sharing bandwidth in communication between a plurality of mobile clients and a plurality of access points, the method comprising: receiving client information from the plurality of mobile clients; determining that each of the plurality of mobile clients has been connected to an access point; determining if any access point has a subgroup of multiple mobile clients connected to it; and if affirmative, determining, on the basis of the client information, possible access points for each mobile client in said subgroup; assigning, for a first mobile client residing outermost in said subgroup, the outermost possible access point in the corresponding direction; assigning, for any subsequent mobile client in said subgroup, the outermost possible, non-assigned access point in the same direction as for the first mobile client; and signalling, to any mobile client requiring re-location to another access point, the identification of the assigned access point.

According to an embodiment, the client information comprises access point identifiers, such as an SSID (Service Set Identifier), and signal quality data, such as a RSSI (Received Signal Strength Indicator) for all access points that are available for the mobile client.

According to an embodiment, the number of access points equals or exceeds the number of mobile clients.

According to an embodiment, the method further comprises creating a connection matrix comprising possible access points of each mobile client for assigning the access points to the mobile clients.

According to an embodiment, at least one signal quality parameter of the client information is utilized in assigning the access point to the mobile client.

According to an embodiment, the transmission between the mobile clients and the access points is carried out according to any of IEEE 802.11 standard series.

According to an embodiment, the mobile client is arranged in a car of a public transportation vehicle, such as a train, a tram, a metro train or a bus, arranged to travel a predetermined route.

According to an embodiment, the transmission between the mobile communication unit and the access points is used in wireless offload for transmitting data from the mobile communication unit to at least one of the access points for further forwarding the data to a data communication network.

A second aspect of the invention includes a computer program product, comprising computer program code embodied on a computer readable medium, wherein said computer program code is, when executed on a processor of a computer, arranged to cause the computer to perform the method of any of the embodiments above.

A third aspect of the invention relates to a system comprising a plurality of mobile clients and a plurality of access points, and a control unit arranged to share bandwidth in communication between said mobile clients and said access points, wherein the control unit is arranged to: receive client information from the plurality of mobile clients; determine that each of the plurality of mobile clients has been connected to an access point; determine if any access point has a subgroup of multiple mobile clients connected to it; and if affirmative, determine, on the basis of the client information, possible access points for each mobile client in said subgroup; assign, for a first mobile client residing outermost in said subgroup, the outermost possible access point in the corresponding direction; assign, for any subsequent mobile client in said subgroup, the outermost possible, non-assigned access point in the same direction as for the first mobile client; and signal, to any mobile client requiring re-location to another access point, the identification of the assigned access point.

A fourth aspect of the invention relates to a mobile communication unit arranged to communicate in a shared spectrum technology, the mobile communication unit being arranged to scan frequencies of access points for finding the available access points; establish a connection to a first access point; receive a request from a control unit to re-locate to another access point; and establish a connection to a second access point indicated by the control unit.

BRIEF DESCRIPTION OF THE DRAWINGS

The invention will now be described in more detail in connection with preferred embodiments with reference to the appended drawings, in which.

DETAILED DESCRIPTION

Figure 1:
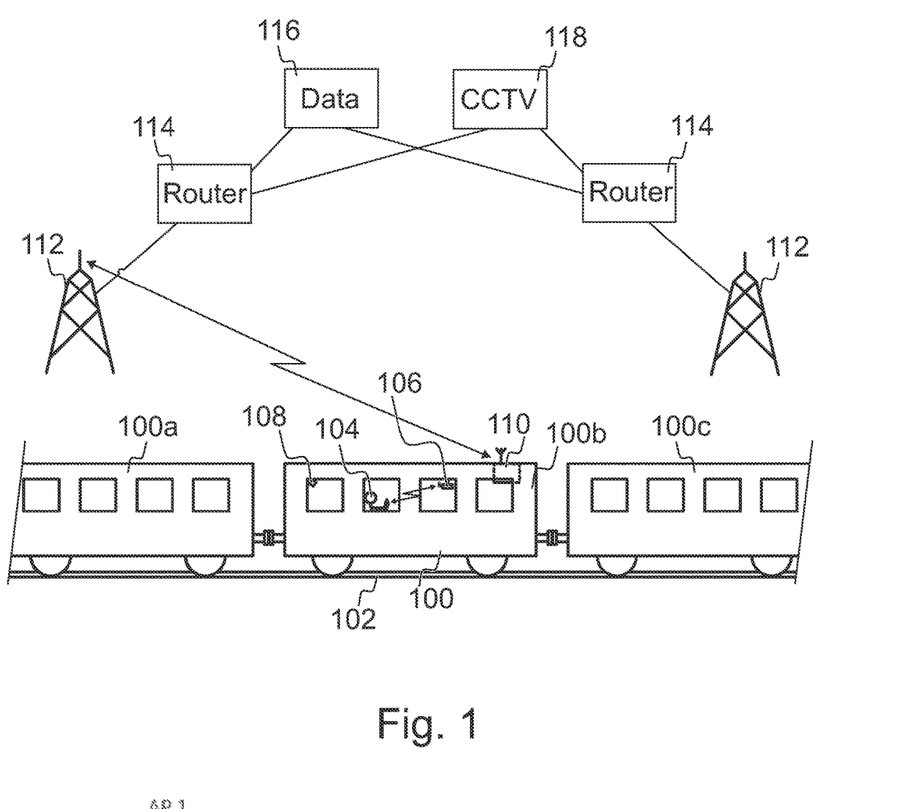
FIG. 1 shows a simplified example of the operating principle of a wireless data offload system.

FIG. 1 shows a simplified example of the operating principle of a wireless data offload system. FIG. 1 illustrates a rail traffic vehicle 100, such as a train, a tram or a metro train, travelling on the rails 102. The rail traffic vehicle 100 may comprise one or more cars 100a, 100b, 100c, etc., typically arranged to transport passengers. A wireless data connection, such as a Wi-Fi connection, may be offered for the passengers to be used during their trip. In FIG. 1, a passenger 104 uses his/her mobile device via a wireless connection provided by a wireless base station 106. Moreover, each car may include one or more surveillance cameras 108 capturing video surveillance data within the car. During the trip, especially the video surveillance data may amount to an extensive quantity of data.

The vehicle 100 comprises at least one mobile communication unit 110, which is arranged to communicate with at least one access point 112 arranged along a route of the vehicle 100. The mobile communication unit 110 is arranged to obtain data from one or more data sources, such as one or more surveillance cameras and/or one or more data terminals operated by passengers, arranged in functional connection with the mobile communication unit. The mobile communication unit 110 comprises a transmitter arranged to transmit the data to the access point 112.

The access point 112 comprises a receiver arranged to receive the data, and it is further arranged to forward the data to a data target for decoding. The data targets may comprise, for example, a data communication network 116 and a video surveillance system 118, and the access point 114 may be arranged to forward the video data from said one or more surveillance cameras to the video surveillance system 118 and user data from said one or more data terminals operated by the passengers to the data communication network 116. The system may comprise one or more routers 114 arranged to route the data to an appropriate data target.

The mobile communication unit 110 may further comprise a video recorder arranged to buffer at least a part of the video data from said one or more surveillance cameras and/or a data storage arranged to buffer at least a part of the user data from said one or more data terminals operated by the passengers before transmission to the access point.

The rapid development of WLAN (wireless local area networks) technology has made the WLANs popular, besides in the home due to ease of installation and use, but also in offices and various public premises (so-called HotSpots) offering wireless access either to a limited group of users or to anyone. While various names and acronyms, such as WLAN, Wi-Fi, 802.11, etc. are used for wireless local area networks, they all typically refer to wireless access technology defined in IEEE standard series 802.11, including multiple versions of the IEEE 802.11, such as 802.11b, 802.11g, 802.11a, 802.11n, 802.11ac. Unlike licensed spectrum devices, such as mobile cellular networks, where the usage of bandwidth is strictly controlled, IEEE 802.11 technology is used as a shared medium that operates in unlicensed radio frequency ranges of 2.4 GHz and/or 5 GHz.

Due to the shared medium principle, WLAN clients tend to connect to an access point (AP) offering the best signal strength. If the communication between the mobile communication unit 110 and the access points 112 is arranged to be carried out using a WLAN technology, this may cause problems in performing the offload efficiently.

A public transportation vehicle, such as a train, a tram, a metro train or a bus, is typically arranged to travel a predetermined route, whereby the system may comprise a plurality of access points arranged along said route. The access points may be positioned, for example, at the stations or in a depot where the vehicle is configured to stop, whereby the buffered video and/or user data may be transferred to the access point during the stoppage.

Figure 2:
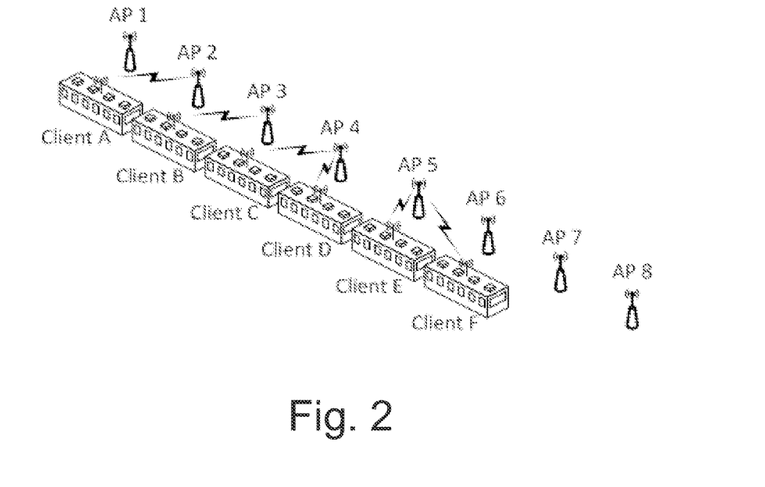
FIG. 2 shows an example, where wireless data offload is performed simultaneously from a plurality of railcars to a plurality of access points.

FIG. 2 shows an example, where wireless offload is performed simultaneously from six different railcars, each including a separate client (clients A-F) performing the offload. In the station, there are eight access points (AP1-AP8) available for the client nodes in the railcars to establish a connection. The clients A-F connect to the access points seemingly randomly; i.e. the clients most probably select the access point according to the signal strength offered by the access point. As depicted in the example of FIG. 2, client A connects to AP1, client B connects to AP3, whereas AP4 and AP5 both have two clients (clients C and D, and E and F, correspondingly) connected. On the other hand, no client is connected to AP1, AP6, AP7 or AP8. In other words, all clients could have their own access point and hence better bandwidth.

As becomes evident from the above, the amount of data to be transmitted from the mobile communication unit to the access point may be very large. Therefore, wireless offload requires maximum throughput and optimal bandwidth sharing among the clients would be one factor to ensure that maximum throughput can be achieved. The uneven sharing of the available access points in the station results in non-optimized bandwidth availability for the offload in different railcars. It may also result in complete failure of the wireless offload for some railcars, due to too many clients accessing the same access point and hence too low bandwidth available for each client to perform offload.

Thus, there is a need for a solution for sharing the available bandwidth of all access points more evenly and more optimally between the clients.

In order to alleviate these problems, a new method for sharing bandwidth in communication between a plurality of mobile clients and a plurality of access points is presented herein. The method is based on the idea that instead of allowing the mobile clients freely select their access point, an algorithm executed by a control unit determines the initial allocation of the mobile clients between the access points and in order to balance the sharing of bandwidth, re-assigns one or more mobile clients to connect to another access point, if necessary.

Figure 3:
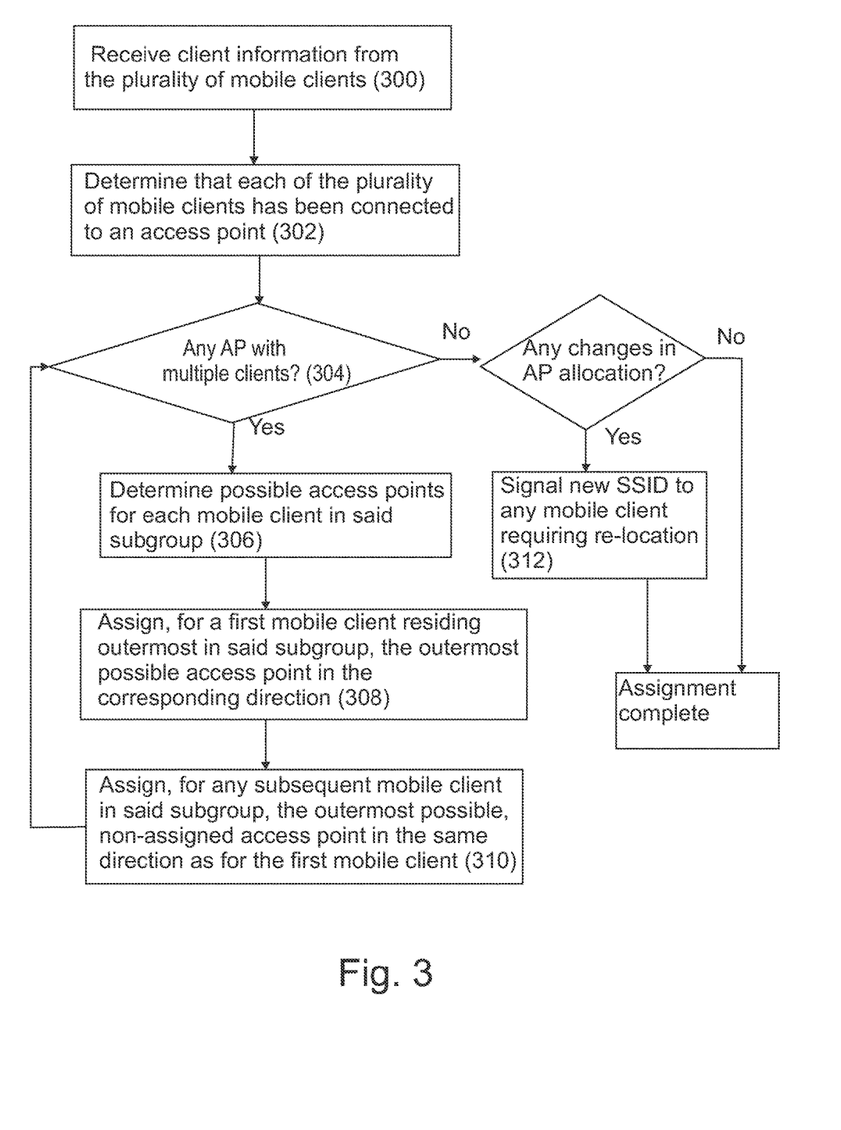
FIG. 3 shows a flow chart of an access point assignment process according to an embodiment.

A method according to a first aspect and various embodiments related thereto are now described by referring to the flow chart of FIG. 3. The method of FIG. 3 may be applied in a control unit of a system comprising a plurality of mobile clients and a plurality of access points. The control unit is arranged to communicate at least with the access points, and it may be implemented in one or more of the access point units, one or more of the mobile client unit, or as a separate unit. It is noted that the control unit should be interpreted as a logical entity, preferably implemented as software procedure possibly distributed among a plurality of entities of the system. The implementation of the control unit is discussed more in detail further below.

The method according to the first aspect comprises receiving (300) client information from the plurality of mobile clients; determining (302) that each of the plurality of mobile clients has been connected to an access point; determining (304) if any access point has a subgroup of multiple mobile clients connected to it; and if affirmative determining (306), on the basis of the client information, possible access points for each mobile client in said subgroup; assigning (308), for a first mobile client residing outermost in said subgroup, the outermost possible, non-assigned access point in the corresponding direction; assigning (310), for any subsequent mobile client in said subgroup, the outermost possible, non-assigned access point in the same direction as for the first mobile client; and signalling (312), to any mobile client requiring re-location to another access point, the identification of the assigned access point.

Herein, when the multiple mobile clients initially connect to the access points, for example when a train arrives at a station, each of the mobile clients scans the available access points and stores the data describing the available connections. The mobile client then selects one of the available connections, typically the one with the strongest signal, and sends the client information, i.e. the data describing the available connections of the mobile client, for example, to its access point. Alternatively, the client information may be sent to a plurality of access points, to other mobile clients or to a separate control unit. The recipients may be defined as a multicast group and the client information may sent as a multicast. The client information may contain e.g. an SSID (Service Set Identifier) and signal quality data for all access points that are available for the mobile client to use for offload. The signal quality can be measured, for example, as the received signal strength indicator (RSSI), indicating the power present in a radio signal received from the access point.

Figure 4:
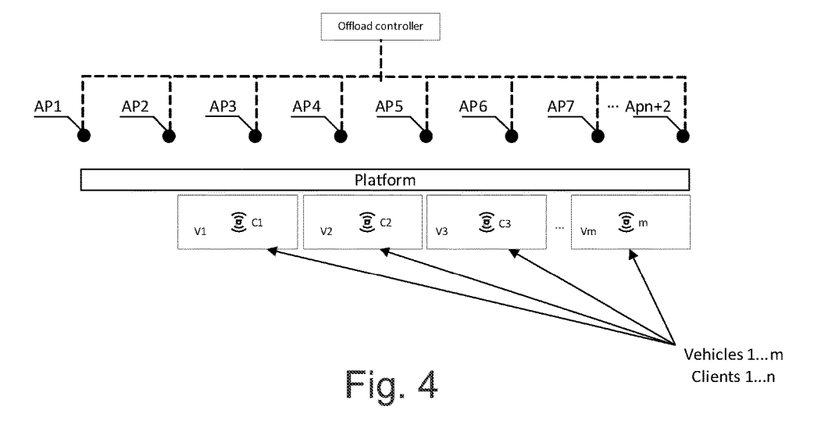
FIG. 4 shows an example configuration of the elements belonging to the system.

The access points share the client information received from the mobile client(s) connected to them such that at least the control unit is aware of the client information of each mobile client connected to any of the access points. As mentioned, the control unit may be implemented in various ways. FIG. 4 shows an example configuration of the elements belonging to the system. In FIG. 4, a plurality of vehicle subunits V1, V2, . . . , Vm, such as train cars, has stopped along a platform of a station. Typically each car, at least a passenger car, is provided with at least one mobile client C1, C2, . . . , Cn, such as a WLAN client, for carrying out the wireless offload. However, some cars may lack a mobile client of its own, while some other cars may have several mobile clients; therefore, there may appear a situation where m≠n.

The station is provided with a plurality of access points AP1, AP2, . . . , APn+2. According to an embodiment, the number of access points in the stations equals or exceeds the number of mobile clients in the vehicle. This would advantageous, when designing a wireless offload system for public transportation vehicles, since it would enable one-to-one correspondence, i.e. one mobile client connected to one access point. However, while being feasible in most occasions, there may appear a situation where the number of access points in the stations is less than the number of mobile clients in the vehicle.

In FIG. 4, the control unit, i.e. the Offload controller, is shown as a separate unit having control over all access points AP1, AP2, . . . , APn+2. However, it is also possible that one of the access points operates as the control unit, wherein the other access points need to share their client information at least to the access point operation as the control unit. Moreover, it is possible to implement the operation of the control unit as distributed software shared to two or more, possibly all access points, wherein all the client information needs to be shared among all access points participating to the control unit operation. As a further option, it is possible that one or more, possibly all mobile clients operates as the control unit, wherein all the client information needs to be shared by all access points among the mobile clients participating to the control unit operation.

For the implementation of the embodiments, it is irrelevant in which format the client information is shared. For example, JavaScript Object Notation (JSON) formatting can be used for sharing the client information as shown below.

```
{
    "id":      "Client A",
    "access points":
    [
            { "id": "AP 1", "Signal quality": "3" },
            { "id": "AP 2", "Signal quality": "4"}
    ]
}
```

Referring back to FIG. 3, the control unit determines that each of the plurality of mobile clients has been connected to an access point. There are many options for the control unit to make the decision. The number of mobile clients in the vehicle may be known to the control unit in advance, and after the correct number of mobile clients has been connected to the access point, the decision is made. Alternatively or in addition, there may be a timer running, for example, from the moment of the vehicle arriving to the station or from the first client connection established to an access point, and after a predetermined threshold of the timer is reached, it is concluded that all clients have connected to the access points. It is noted herein that there may appear a situation that one or more of the vehicle subunits, such as train cars, while having a mobile client unit may nevertheless have no data to be offloaded. Therefore, it is not advisable to have such mobile client units connected to the access points.

After having determined that no more clients are taken into consideration, the control unit determines if any access point has a subgroup of multiple mobile clients connected to it. If not, i.e. there is one-to-one correspondence such that only one mobile client is connected to any access point, the available bandwidth is optimally shared and the wireless offload procedure may start.

However, if there is at least one access point, to which a subgroup, i.e. two or more, even all, of mobile clients have been connected, the control unit determines, on the basis of the client information, possible access points for each of said two or more mobile clients. For example, in a wireless offload system for public transportation vehicles, the distances between the mobile clients and the access points in a station are typically so short that any mobile client may have two or more possible access points to connect.

Now, for a first mobile client residing outermost in said subgroup, the outermost possible access point in the corresponding direction is assigned. Herein, the point of view for determining the direction may be from the mobile clients towards the access points, or vice versa. The outermost may refer to the leftmost or the rightmost access point. For example, if the mobile clients C1, C2 and C3 are initially all connected to the access point AP1, and the direction is determined from the mobile clients towards the access point and the outermost is determined as the leftmost, and assuming that access points AP1 and AP2 are available for the mobile client C1, then the control unit assigns the access point AP1 for the mobile client C1.

Let us assume that access points AP1, AP2 and AP3 are available for the mobile client C2 and access points AP1, AP2, AP3 and AP4 are available for the mobile client C3. Now, for the mobile client C2, the control unit assigns the outermost possible, non-assigned access point in the same direction as for the first mobile client C1; in other words, access point AP2 is assigned to the mobile client C2. In a similar manner, for the mobile client C3, the control unit again assigns the outermost possible, non-assigned access point in the same direction as for the first mobile client C1; i.e. access point AP3 is assigned to the mobile client C3.

Assigning the access points within a subgroup of mobile clients may result in assigning a mobile client to an access point already having one or more mobile clients connected to it, thereby creating a new subgroup of mobile clients connected to the same access point. Therefore, the control unit advantageously returns to determine if any access point has a subgroup of multiple mobile clients connected to it;

if yes, the previous steps are repeated for the new subgroup of mobile clients. It is noted that in a typical configuration of the system, where the number of access points in the station equals or exceeds the number of mobile clients in the vehicle, the iteration of the above steps finally leads to optimal bandwidth sharing with one-to-one correspondence, i.e. one mobile client is connected to one access point. Even in a situation where the number of access points in the station is less than the number of mobile clients in the vehicle, most of the mobile clients can be provided with one-to-one correspondence. Thus, even if one or two access points may still have two or more mobile clients connected, there is still provided an enhanced bandwidth sharing compared to known solution.

Finally, it is checked if the above process caused one or more mobile clients to be re-located to another access point, and if affirmative, the control units signals, via an access point, to any mobile client requiring re-location to another access point, the identification of the assigned access point.

Figure 5A:
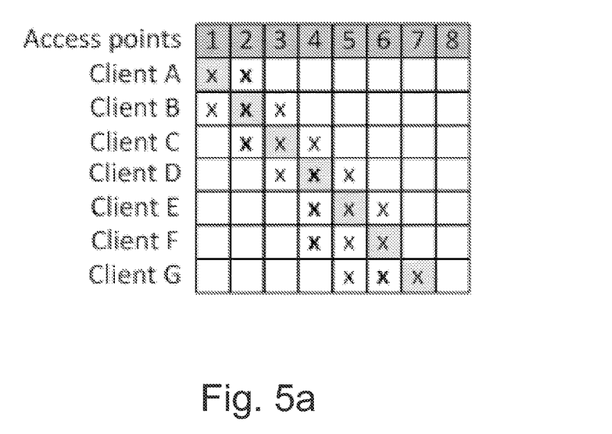
FIGS. 5a, 5b, 5c show an example of utilization of a connection matrix in an access point assignment process according to an embodiment.

According to an embodiment, for assigning the access points to the mobile clients, the control unit creates a connection matrix comprising possible access points of each mobile client. FIG. 5a shows an example of the connection matrix, where 'x' presents an access point that is available for use for the mobile client and the bolded 'x' indicates the access point to which the mobile client is currently connected. In the example of FIG. 5a, it is assumed that the leftmost possible access point is to be selected for each mobile client.

Thus, the initial situation in the example of FIG. 5a is that the mobile clients A, B and C are all connected to the access point AP2, the mobile clients D, E and F are all connected to the access point AP4, and the mobile client G is connected to the access point AP6.

Figure 5B:
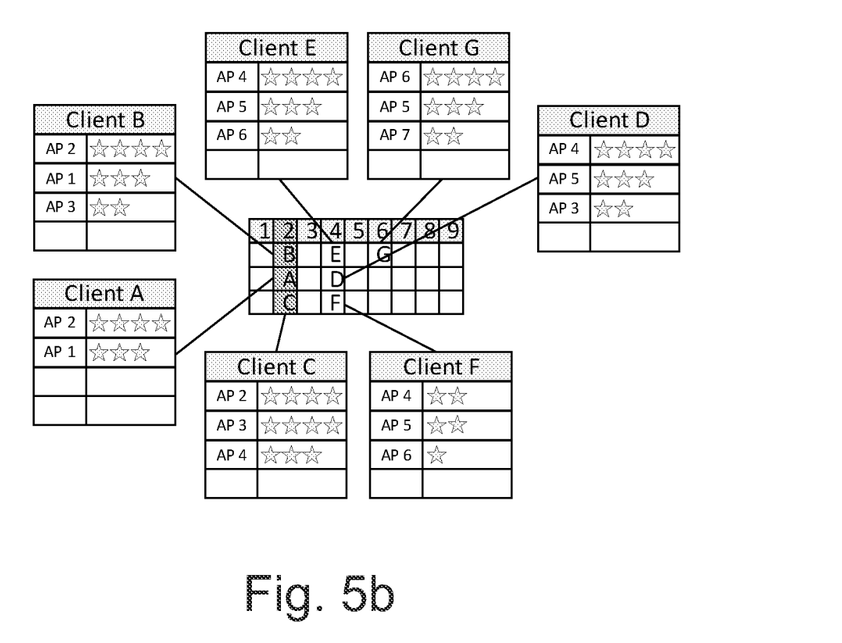

FIG. 5b shows an example of client information obtained by the control unit regarding the initial situation described in FIG. 5a. For each mobile client, the possible access points are provided and signal quality of each possible access point is indicated by a number of stars; the more stars, the better signal quality towards the mobile client in question.

Figure 5C:
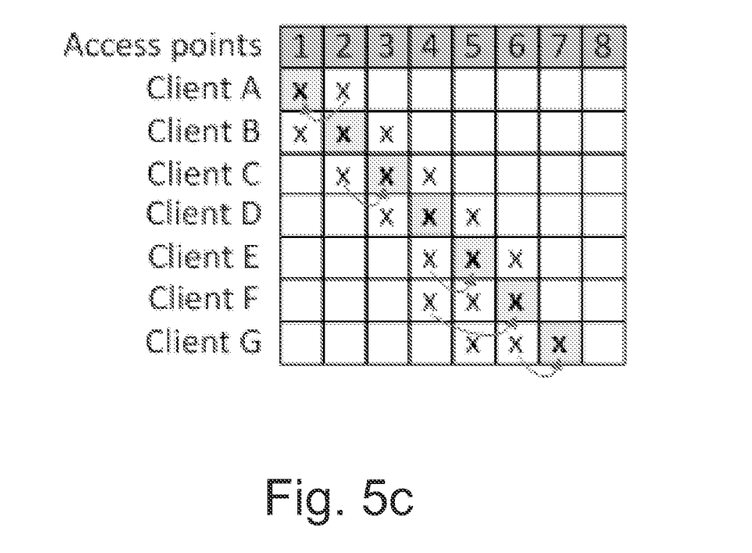

FIG. 5c shows the access point allocation between the mobile clients after the assignment process has been completed. As a result of the assignment process, the subgroup of the mobile clients A, B and C connected initially to the access point AP2 are assigned to the leftmost possible access point such that client A is re-located to the access point AP1, client B is assigned the leftmost of its possible, non-assigned access points, in other words client B remains at the access point AP2, and client C is re-located to the access point AP3. Similarly, the subgroup of the mobile clients D, E and F connected initially to the access point AP4 are assigned to the leftmost possible access point such that client D remains at the access point AP4, and the clients E and F are re-located to the access points AP5 and AP6, correspondingly. However, this creates a new subgroup of mobile clients F and G both being connected to the access point AP6, which problem is solved by assigning the access point AP7 (i.e. the leftmost possible access point) for the mobile client G. The assignment process is completed by the control unit sending a message containing a 'new AP' information to each of the mobile clients A, C, E, F and G that they need to change their access point to the access point indicated in the message.

In the assignment process above, the signal quality information is not used in assigning the access point, but the criterion is to select outermost possible (non-assigned) access point in a given direction. However, according to an embodiment, at least a signal quality parameter of the client information is utilized in assigning the access point to the mobile client. Thus, RSSI and possibly other parameters can be added to the assignment process to create more sophisticated algorithm. For example, the decision to select outermost possible access point can be overruled, if the RSSI information indicates that two or more mobile clients would benefit by obtaining better signal quality if they mutually change their assigned access points.

From the perspective of the mobile client, the operations related to the assignment process may include scanning the frequencies of the access points for finding the available access points; establishing a connection to a first access point; receiving a request from the control unit to re-locate to another access point; and establishing a connection to a second access point indicated by the control unit.

Figure 6:
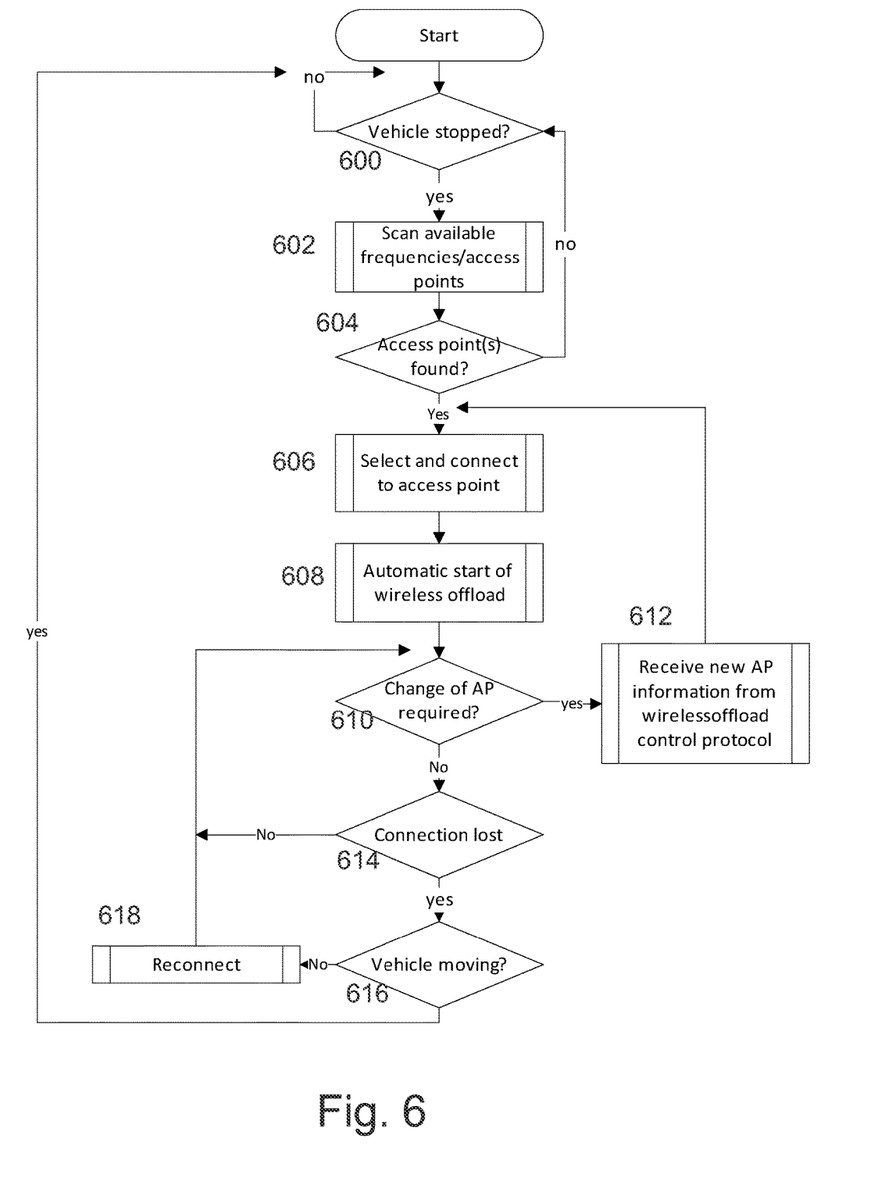
FIG. 6 shows a flow chart of operations of a mobile client in wireless data offload process according to an embodiment.

These and other mobile client operations relating to various embodiments of a wireless offload process in a public transportation vehicle are shown in a flow chart of FIG. 6. According to an embodiment described in FIG. 6, the mobile client determines (600) whether the vehicle has stopped. Herein, the mobile client may utilize satellite positioning data, such as GPS, and/or sensors provided with the mobile client to determine when the vehicle has stopped.

Upon noticing that the vehicle has stopped, the mobile client scans (602) the frequency range of the access points and measures the RSSI from all available frequencies/access points. It is, however, noted that for starting the wireless offload process, it is not necessary that the vehicle has stopped. For example, the mobile client may start scanning the frequencies of the access points already when approaching the place, such as a station, where the access points are located. However, if no access points are found (604), it may be an indication that the mobile client needs to wait until the vehicle has stopped.

From the found access points, the mobile client selects (606) and connects to an access point with the best RSSI. The mobile client also sends its client information, i.e. the data describing the available connections of the mobile client, to the selected access point. According to an embodiment, the wireless offload may start (608) automatically upon establishing the connection. However, the mobile client remains waiting (610) for information, if the change of an access point is needed; in other words, the control unit, after having received the client information from all mobile clients, determines if the mobile client in question needs to be re-located to another access point.

If the change of an access point is needed, then the mobile client receives (612) information, preferably an SSID of the new access point, and returns to select (606) the access point based on SSID.

FIG. 6 discloses some further embodiments for ensuring the connection for the wireless offload. The mobile client preferably monitors (614) that the connection is not and yet remains waiting (610) for information, if the change of an access point is needed. However, if the connection is lost, it is detected (616) if the vehicle is moving. If not, the mobile client tries to reconnect (618) to the previous access point. However, if the vehicle is moving, it is an indication to stop the wireless offload process and wait for the next stop.

According to an embodiment, the transmission between the mobile communication unit and the access points is carried out according to any of IEEE 802.11 standard series. It is, however, noted that the implementation of the embodiments disclosed herein are not limited to the WLAN technology according to any of IEEE 802.11 standard series only, but the embodiments may be applied to any similar wireless communication technology encountering the bandwidth sharing problem.

In the above examples the mobile communication unit has been described as being connected to a public transportation vehicle. However, the embodiments are not limited to vehicles, but at least some of the embodiments are applicable, for example, to any portable or handheld communication devices, such mobile phones, smart phones, tablets or laptop computers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such non-transitory physical media as memory chips, or memory blocks implemented within the processor, magnetic media such as hard disk or floppy disks, and optical media such as for example DVD and the data variants thereof, CD.

A skilled man appreciates that any of the embodiments described above may be implemented as a combination with one or more of the other embodiments, unless there is explicitly or implicitly stated that certain embodiments are only alternatives to each other.

With the arrangement described above, the available bandwidth of all access points can be more optimally shared among the mobile clients and hence the performance of wireless offload may be improved. Moreover, in most cases, it enables one-to-one correspondence as mobile client-access point pairs, whereupon an automated selection of optimal pairs can be achieved.

It will be obvious for a person skilled in the art that with technological developments, the basic idea of the invention can be implemented in a variety of ways. Thus, the invention and its embodiments are not limited to the above-described examples but they may vary within the scope of the claims.

The invention claimed is:

1. A method for sharing bandwidth by a control unit in communication between a plurality of mobile clients and a plurality of access points, the control unit being a separate unit or the functionalities of the control unit being implemented in one or more mobile clients or one or more access points, the method comprising:
   receiving client information regarding the plurality of mobile clients, said client information comprising data about available access point connections of each mobile client;
   receiving information from the access points that each of the plurality of mobile clients has been connected to an access point, wherein the number of access points equals or exceeds the number of mobile clients;
   determining if any access point has a subgroup of multiple mobile clients connected to it; and if affirmative
   determining, on the basis of the client information, possible access points for each mobile client in said subgroup;
   assigning, for a first mobile client residing leftmost in said subgroup, the leftmost possible access point, or for a first mobile client residing rightmost in said subgroup, the rightmost possible access point,
   assigning, for any subsequent mobile client in said subgroup, the leftmost or the rightmost possible, non-assigned access point in the same direction as for the first mobile client; and
   signalling, to any mobile client requiring re-location to another access point, the identification of the assigned access point.

2. The method according to claim 1, wherein the client information comprises access point identifiers and signal quality data for all access points that are available for the mobile client.

3. The method according to claim 1, further comprising:
creating a connection matrix comprising possible access points of each mobile client for assigning the access points to the mobile clients.

4. The method according to claim 1, wherein at least one signal quality parameter of the client information is utilized in assigning the access point to the mobile client.

5. The method according to claim 1, wherein the transmission between the mobile clients and the access points is carried out according to any of IEEE 802.11 standard series.

6. The method according to claim 1, wherein the mobile client is arranged in a car of a public transportation vehicle, such as a train, a tram, a metro train or a bus, arranged to travel a predetermined route.

7. The method according to claim 1, wherein the transmission between the mobile communication unit and the access points is used in wireless offload for transmitting data from the mobile communication unit to at least one of the access points for further forwarding the data to a data communication network.

8. A computer program product, comprising computer program code embodied on a computer readable medium, wherein said computer program code is, when executed on a processor of a computer, arranged to cause the computer to perform
receiving client information regarding the plurality of mobile clients, said client information comprising data about available access point connections of each mobile client;
receiving information from the access points that each of the plurality of mobile clients has been connected to an access point, wherein the number of access points equals or exceeds the number of mobile clients;
determining if any access point has a subgroup of multiple mobile clients connected to it and if affirmative
determining, on the basis of the client information, possible access points for each mobile client in said subgroup;
assigning, for a first mobile client residing leftmost in said subgroup, the leftmost possible access point, or for a first mobile client residing rightmost in said subgroup, the rightmost possible access point,
assigning, for any subsequent mobile client in said subgroup, the leftmost or the rightmost possible, non-assigned access point in the same direction as for the first mobile client; and
signalling, to any mobile client requiring re-location to another access point, the identification of the assigned access point.

9. A system comprising a plurality of mobile clients and a plurality of access points, and a control unit arranged to share bandwidth in communication between said mobile clients and said access points, the control unit being a separate unit or the functionalities of the control unit being implemented in one or more mobile clients or one or more access points, wherein the control unit is arranged to:
receive client information regarding the plurality of mobile clients, said client information comprising data about available access point connections of each mobile client;
receive information from the access points that each of the plurality of mobile clients has been connected to an access point, wherein the number of access points equals or exceeds the number of mobile clients;
determine if any access point has a subgroup of multiple mobile clients connected to it; and if affirmative
determine, on the basis of the client information, possible access points for each mobile client in said subgroup;
assign, for a first mobile client residing leftmost in said subgroup, the leftmost possible access point in the corresponding direction or for a first mobile client residing rightmost in said subgroup, the rightmost possible access point,
assign, for any subsequent mobile client in said subgroup, the leftmost or the rightmost possible, non-assigned access point in the same direction as for the first mobile client; and
signal, to any mobile client requiring re-location to another access point, the identification of the assigned access point.

10. The system according to claim 9, wherein the client information comprises access point identifiers and signal quality data for all access points that are available for the mobile client.

11. The system according to claim 9, wherein the control unit is further arranged to:
create a connection matrix comprising possible access points of each mobile client for assigning the access points to the mobile clients.

12. The system according to claim 9, wherein at least one signal quality parameter of the client information is utilized in assigning the access point to the mobile client.

13. The system according to claim 9, wherein the transmission between the mobile clients and the access points is carried out according to any of IEEE 802.11 standard series.

14. The system according to claim 9, wherein the mobile client is arranged in a car of a public transportation vehicle, such as a train, a tram, a metro train or a bus, arranged to travel a predetermined route.

15. The system according to claim 9, wherein the transmission between the mobile communication unit and the access points is arranged to be used in wireless offload for transmitting data from the mobile communication unit to at least one of the access points for further forwarding the data to a data communication network.

16. An apparatus comprising a processor, a memory and a computer program, comprising computer program code embodied on a non-transitory computer readable medium, wherein said computer program code is, when executed on the processor of the apparatus, arranged to cause the apparatus to perform
receiving client information regarding the plurality of mobile clients, said client information comprising data about available access point connections of each mobile client;
receiving information from the access points that each of the plurality of mobile clients has been connected to an access point, wherein the number of access points equals or exceeds the number of mobile clients;
determining if any access point has a subgroup of multiple mobile clients connected to it; and if affirmative
determining, on the basis of the client information, possible access points for each mobile client in said subgroup;
assigning, for a first mobile client residing leftmost in said subgroup, the leftmost possible access point, or for a first mobile client residing rightmost in said subgroup, the rightmost possible access point, assigning, for any subsequent mobile client in said subgroup, the leftmost or the rightmost possible, non-assigned access point in the same direction as for the first mobile client; and signalling, to any mobile client requiring re-location to another access point, the identification of the assigned access point.

\* \* \* \* \*